(12) United States Patent
Ramachandran et al.

(10) Patent No.: US 12,165,053 B2
(45) Date of Patent: Dec. 10, 2024

(54) SYSTEM AND METHOD FOR GRAPH-BASED RESOURCE ALLOCATION USING NEURAL NETWORKS

(71) Applicant: Salesforce, Inc., San Francisco, CA (US)

(72) Inventors: Govardana Sachithanandam Ramachandran, Palo Alto, CA (US); Ivan Brugere, Palo Alto, CA (US); Lav Varshney, Champaign, IL (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 995 days.

(21) Appl. No.: 16/950,853

(22) Filed: Nov. 17, 2020

(65) Prior Publication Data
US 2021/0256370 A1    Aug. 19, 2021

Related U.S. Application Data

(60) Provisional application No. 62/976,950, filed on Feb. 14, 2020.

(51) Int. Cl.
*G06N 3/08* (2023.01)
*G06Q 10/047* (2023.01)
*G06Q 10/0631* (2023.01)

(52) U.S. Cl.
CPC ............. *G06N 3/08* (2013.01); *G06Q 10/047* (2013.01); *G06Q 10/0631* (2013.01)

(58) Field of Classification Search
CPC ..... G06N 3/08; G06Q 10/0631; G06Q 10/047
See application file for complete search history.

(56) References Cited

U.S. PATENT DOCUMENTS

| 10,425,832 | B1 * | 9/2019 | Zawadzki | ........... H04L 41/5077 |
| 2021/0374582 | A1 * | 12/2021 | Tristan | ................... G06N 20/10 |
| 2022/0270192 | A1 * | 8/2022 | Paz Erez | ............ G06Q 10/0637 |

OTHER PUBLICATIONS

A Practical Approach to Detecting and Correcting Bias in AI Systems; Feb. 21, 2019; Macskassy (Year: 2019).*
Addressing Unintended Bias in Smart Cities; Apr. 23, 2018; Eve (Year: 2018).*

(Continued)

*Primary Examiner* — Deirdre D Hatcher
(74) *Attorney, Agent, or Firm* — Haynes and Boone, LLP

(57) ABSTRACT

A method for using a neural network to generate an improved graph model includes receiving, by the neural network, a graph model. The graph model is based on data relating to an environment for allocating resources to a first group and a second group. The method further includes receiving, by the neural network, a budget for editing the graph model based on a cost of corresponding modification to the environment, and determining, by the neural network, a fairness representation based on a fairness requirement between the first and second groups. It is determined by the neural network, a utility function for the graph model based on first and second group utilities representing resource allocation to the first and second groups respectively. Reinforcement learning is performed on the neural network to generate the improved graph model using the utility function and the fairness representation.

20 Claims, 8 Drawing Sheets

(56) References Cited

OTHER PUBLICATIONS

How to define fairness to detect and prevent discriminatory outcomes IN Machine Learning, Sep. 23, 2019; Cortez (Year: 2019).*
How to Prevent Discriminatory Outcomes in Machine Learning; Mar. 2018 (Year: 2018).*
The Ethics of Using Artificial Intelligence in city services; Jun. 12, 2019 (Year: 2019).*
Beutel et al., Fairness in Recommendation Ranking through Pairwise Comparisons, In Proceedings of the 25th ACM SIGKDD International Conference on Knowledge Discovery and Data Mining (KDD' 19), Association for Computing Machinery, New York, NY, USA, 2019, 16 pages.
Bose et al., "Compositional Fairness Constraints for Graph Embeddings" arXiv preprint arXiv:1905.10674, 2019, 11 pages.
Carion et al., "A Structured Prediction Approach for Generalization in Cooperative Multi-Agent Reinforcement Learning," In Advances in Neural information Processing Systems 32, H. Wallach, H. Larochelle, A. Beygelzimer, F. d'Alche-Buc, E. Fox, and R. Garnett (Eds.), Curran Associates, Inc., 2019, 18 pages.
Chung et al., "Connected components in random graphs with given expected degree sequences," Annals of combinatorics, vol. 6, No. 2, 2002, 27 pages.
Crescenzi et al., "Greedily Improving Our Own Closeness Centrality in a Network," ACM Transactions on Knowledge Discovery from Data (TKDD) 11, 1, 2016, pp. 1-32.
Dwork et al., "Fairness under composition," arXiv Preprint arXiv:1806.06122, 2018, 72 pages.
Feige et al., "A threshold of In n for approximating set cover," Journal of the ACM (fACM), vol. 45, No. 4, 1998, 23 pages.
Groeger et al., "Miseducation: Is There Racial Inequality at Your School?," Retrcived from <https://projects.propublica.org/miseducation/ >, 2018, 7 pages.
Holland et al., "Stochastic blockmodels: First steps," Social networks, vol. 5, No. 2, 1983, pp. 109-137.
Holme et al., "Growing Scale-Free Networks with Tunable Clustering," Phys. Rev., E 65, 026107 2002, 4 pages.
Jang et al., Categorical reparameterization with gumbel-softmax, arXiv 1611.01144, 2016, 13 pages.

John Logan, "Diversity and Disparities: America enters a new century," Russell Sage Foundation, 2014, 493 pages.
Kearns et al., "Preventing Fairness Gerrymandering: Auditing and Learning for Subgroup Fairness," in Procedings of the 35th International Conference on (Procedings of Machine Learnings Research), Jennifer Dy and Andreas Krause (Eds.), vol. 80, PMLR, Stockholmsmassan, Stockholm Sweden, 2019, 9 pages.
Kempe et al., "Maximizing the Spread of Influence through a Social Network," In Proceedings of the Ninth ACM SIGKDD International Conference on Knowdge Discovery and Data Mining (KDD, 03), Computig Machinery, New York, NY, USA, 2003, 10 pages.
Leskoves et al., "Cost-Effective Outbreak Detection in Networks," In Proceedings of the 13th ACM SIGKDD International Knowledge Discovery and Data Mining (KDD '07), Association for Computing Machinery, New York, NY, USA, 2007, 10 pages.
Li et al., "Influence Maximization on Social Graphs: A Survey," IEEE Transactions on Knowledge and Data Engineering, vol. 30, No. 10, Oct. 2018, 21 pages.
Mehrabi et al., "A Survey on Bias and Fairness in Machine Learning", arXiv preprint arXiv:1908.09635, 2019, 31 pages.
Nocedal et al., "Numerical optimization," Springer Science & Business Media, 2006, 683 pages.
Nowzari et al., "Analysis and Control of Epidemics: A Survey of Spreading Processes on Complex Networks", IEEE Control Systems Magazine, vol. 36, No. 1, Feb. 2016, 59 pages.
Orsi et al., "Black-White Health Disparities in the United States and Chicago: A 15-Year Progress Analysis," American Journal of Public Health, vol. 100, No. 2, Feb. 2010, 8 pages.
Tsan-Sheng et al., "On Finding a Smallest Augmentation to Biconnect a Graph," Slam f. Comput., vol. 22, No. 5, Mar. 31, 1992, 38 pages.
Verma et al., "Fairness Definitions Explained," In 2018 IEEE/ACM International Workshop on Software Fairness (Fair Ware), 2018, pp. 1-7.
Wang et al., "On the Fairness of Randomized Trials for Recommendation with Heterogeneous Demographics and Beyond," arXiv:csLG/2001.09328, 2020, 16 pages.
Xiao et al., "Fast linear iterations for distributed averaging," Systems & Control Letters, vol. 53, No. 1, 2004, 14 pages.
Zhang et al., "Data-driven efficient network and surveillance-based immunization," Knowledge and Information Systems, vol. 61, No. 3, 2019, 27 pages.

* cited by examiner

500

Input: A directed graph $\mathbb{G} = (V, E)$, neighborhood function $N_r$, and budget $B$
$E^u := \emptyset$
for $b = 1, 2, \ldots, B$ do
$\quad E^e := E \cup E^u$ $g_{\min} := \mathrm{argmin}\ \{U_g(E^e) | g \in G)\}$
$\quad$ for $u \in V | u \notin N_r(E^e)$ do
$\quad\quad$ for $v \in V | v \in N_r(E^e)$ do
$\quad\quad\quad$ Compute $U_{g_{\min}}(E^e \cup \{(u, v)\})$
$\quad\quad u_{\max}, v_{\max} := \mathrm{argmax}\ \{U_{g_{\min}}(E^e \cup \{(u, v)\})\}$
$\quad\quad E^u := E^u \cup \{(u_{\max}, v_{\max})\}$
return $E^u$

| System design in MRP |
|---|
| Input: The original weight matrix $W_g^0$ |
| Initialize $\tau = 1, \lambda_1 = 0, \lambda_2 = 0, \mu_1, \mu_2, \alpha$ |
| for *until convergence* do |
|     for *Each ADAM optimized minibatch* do |
|         Sample $s_0 \sim \mu(g)$ |
|         if *update_constraint* then |
|             $\theta \leftarrow \theta - \alpha \nabla_\theta (-\mu_1 (\sum_{g \in G} V_g - \overline{V_G})^2 + \lambda_1 (\sum_{g \in G} V_g - \overline{V_G}))$ |
|             $\theta \leftarrow \theta - \alpha \nabla_\theta (-\mu_2 (\sum_{g \in G} E_g - B)^2 - \lambda_2 (\sum_{g \in G} E_g - B))$ |
|         else |
|             $\theta \leftarrow \theta - \alpha \nabla (\sum_{g \in G} V^g)$ |
|         end |
|         update_constraint $\leftarrow$ not update_constraint |
|         if *equity schedule condition is met* then |
|             $\lambda_1^{new} \leftarrow \lambda_1^{old} + \mu_1 (\sum_{g \in G} V_g - \overline{V_G})$ |
|         end |
|         if *edit schedule condition is met* then |
|             $\lambda_2^{new} \leftarrow \lambda_2^{old} + \mu_2 (\sum_{g \in G} E_g - B)$ |
|         end |
|         if *temperature schedule condition is met* then |
|             $\tau = \tau * \nu$ |
|         end |
|     end |
| end |

FIG. 6

SYSTEM AND METHOD FOR GRAPH-BASED RESOURCE ALLOCATION USING NEURAL NETWORKS

RELATED APPLICATIONS

This application claims priority to U.S. Provisional Patent Application No. 62/976,950 filed Feb. 14, 2020, which is incorporated by reference herein in its entirety.

TECHNICAL FIELD

The present disclosure relates generally to machine learning models and neural networks, and more specifically, to graph-based resource allocation using machine learning models and neural networks.

BACKGROUND

Artificial intelligence, implemented with neural networks and deep learning models, has demonstrated great promise as a technique for automatically analyzing real-world information with human-like accuracy. Fairness has emerged as a fundamental challenge in machine learning methods. As such, there is a need for improved machine learning methods for analyzing real-world problems for improved fairness.

BRIEF DESCRIPTION OF THE DRAWINGS

FIG. 5 illustrates a method for using greedy equitable centrality improvement (GECI) for training the neural network for graph-based resource allocation, according to some embodiments.

FIG. 6 illustrates a method for training the neural network for graph-based resource allocation under the constraints by using Markov Reward Process (MRP), according to some embodiments.

Figure 1:
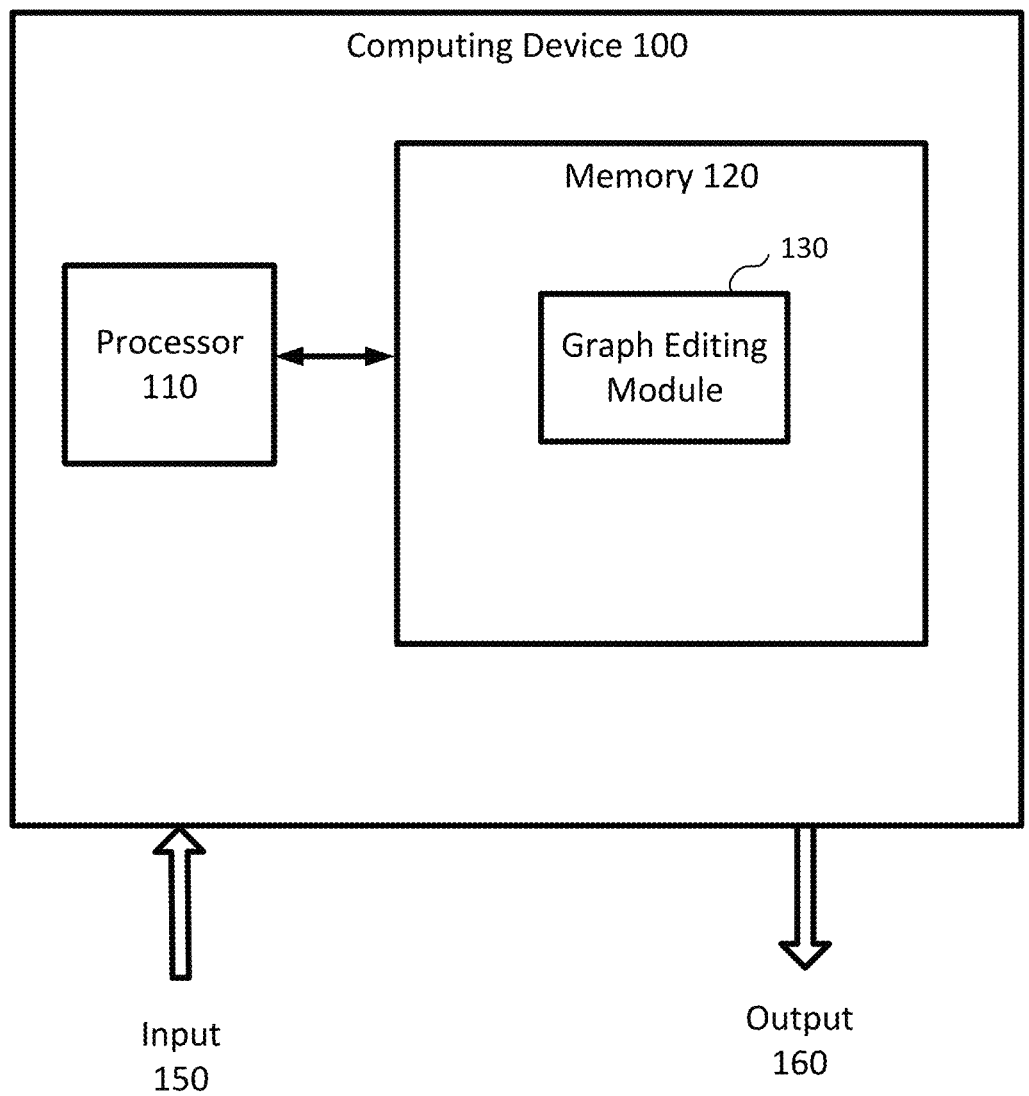
FIG. 1 is a simplified diagram of a computing device according to some embodiments.

In the figures, elements having the same designations have the same or similar functions.

DETAILED DESCRIPTION

Artificial intelligence, implemented with neural networks and deep learning models, has demonstrated great promise as a technique for automatically analyzing real-world information with human-like accuracy. In general, such neural network and deep learning models receive input information, and make predictions based on the same. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques in a number of applications.

Fairness has emerged as a fundamental challenge in machine learning methods using neural networks. Typically, individual and group-level fairness criteria are studied in the absence of highly structured environments that are represented as graphs (e.g., graphs that are used to model a structured environment including transportation infrastructure, transit routes, and resources like schools, libraries, and hospitals) in machine learning. In many machine learning applications, unfairness arises from the structure of the environment. For example, in urban infrastructure networks, the location of high-quality schools, libraries, and parks means that different groups by race, ethnicity, or socioeconomic class have varying access to these resources. Without accounting for this structural information, we observe only the secondary outcomes from this environment, for example disparate school performance, or health. Typically, fairness has only defined group-fairness criteria at a population level on protected attributes, such as race and gender. Such a class of problems are usually combinatorially NP-hard.

As detailed below, an improved method for modifying this structured environment (e.g., of urban infrastructure networks) using graph in neural networks is described. The method is also referred to as solving a Graph Augmentation for Equitable Access (GAEA) Problem. The method defines a graph that corresponds to the structured environment and minimizes the inequity between groups, with sparse edits to a given graph, under a given budget. In some examples, the budget may include a graph edge budget for modification of one or more graph edges corresponding to one or more transit routes between facility locations in the environment, and wherein the facility locations correspond to graph nodes in the graph model. In some examples, the budget may include a graph node budget for modification of one or more graph nodes. In some examples, the budget may limit the edit to graph nodes by not including a graph node budget.

The graph edit budget corresponds to the modification constraints to the structured environment. Specifically, how the graph introduces bias, e.g., for routing and resource allocation, is measured. Further, such bias is mitigated from arising from individuals within an arbitrarily structured graph environment.

Systems and methods for graph-based resource allocation using a neural network and reinforcement learning are described. In some embodiments, a model (e.g., neural network) implements a reinforcement learning approach using a Markov Reward Process. In some examples, the approach includes editing only graph edges without editing graph nodes, to achieve equitable utility across disparate groups, constrained by the cardinality of edits (e.g., with only edge edits). This approach mitigates the impact of bias arising from the structure of the environment on the outcomes of these social groups. The model produces interpretable, localized graph edits and outperforms deterministic baselines. The systems and methods have efficacy and sample efficiency under varied settings. In some examples, the systems and methods can also be adapted to optimal facility placement problems in a network, e.g., by editing graph nodes corresponding to the facility locations.

According to some embodiments, the systems and methods for graph-based resource allocation using a neural network and reinforcement learning may be implemented in one or more computing devices.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a graph editing module 130 that may be used, in some examples, for constrained equitable graph editing using reinforcement learning. In some examples, includes a graph editing module 130 may be implemented using hardware, software, and/or a combination of hardware and software. In some examples, memory 120 may include non-transitory, tangible, machine readable media that includes executable code that when run by one or more processors (e.g., processor 110) may cause the one or more processors to perform the methods described in further detail herein.

As shown, computing device 100 receives input 150, which is provided to includes a graph editing module 130. This input 150 may comprise data for one or more graphs, associated functions (e.g., for travel), budget, time, etc. Graph editing module 130 may generate output 160, which may comprise one or more graphs that have been modified or edited for mitigating disparities (e.g., associated with race, gender, etc.). According to some embodiments, graph editing module 130 may implement and/or emulate one or more neural network systems and models, and corresponding methods, for constrained equitable graph editing using reinforcement learning.

Figure 2B:
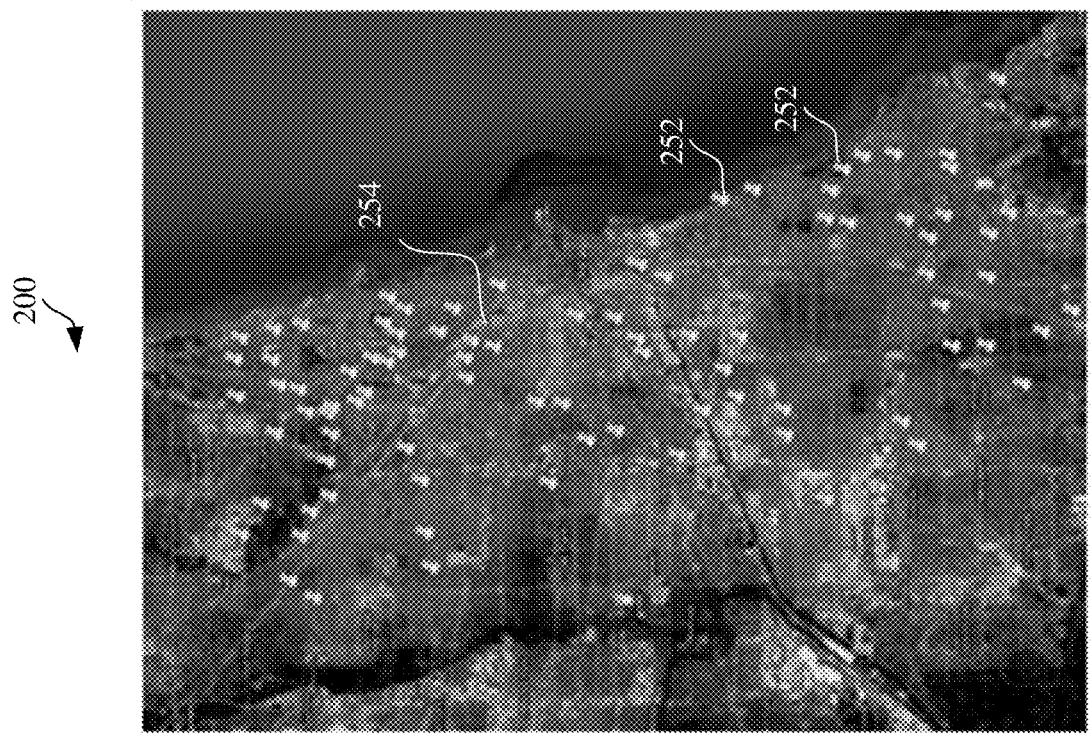
FIG. 2B illustrates resources including public transit network and schools of the example urban area of FIG. 2A according to some embodiments.
Figure 2A:
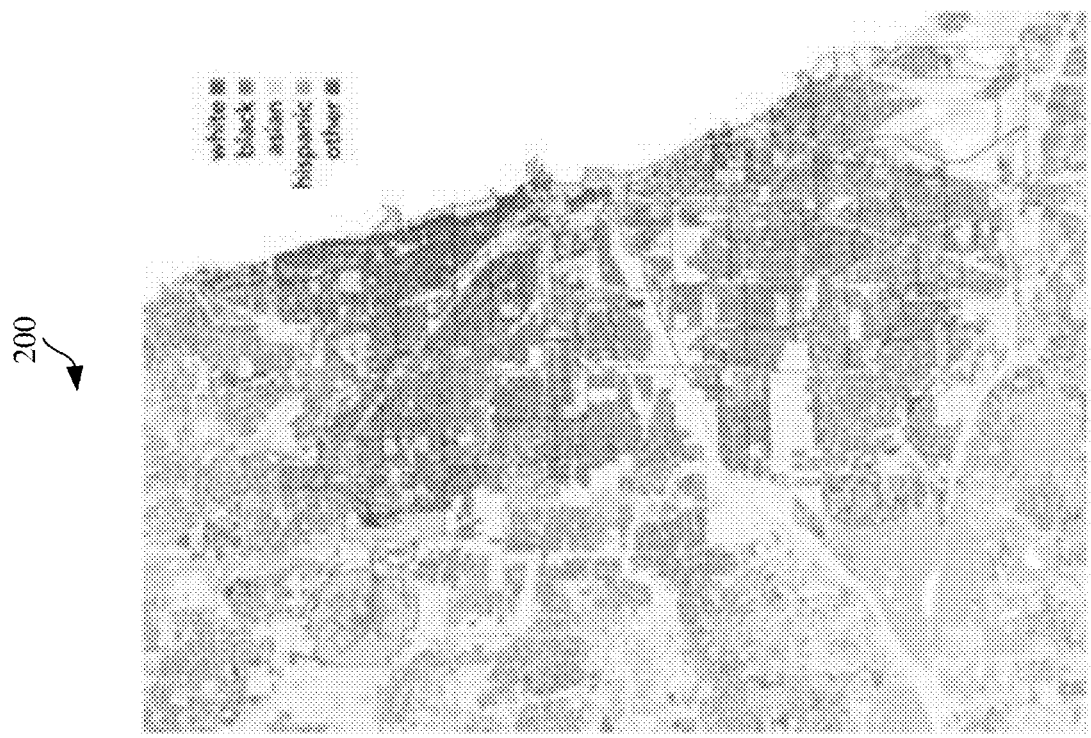
FIG. 2A illustrates demographics of an example urban area according to some embodiments.

Referring to FIGS. 2A and 2B, the systems and methods of the present disclosure may be used applied to a real-world environment 200 for resource allocation for equitable school access in Chicago. The environment includes transportation network data including a transit network 254 (induced from Chicago Transit Authority (CTA) bus routes)) from the City of Chicago, and resources including schools 252 (shown as dropped pins on FIG. 2B) in the area. Demographics of Chicago demonstrate highly segregated areas of the city by race and ethnicity, as shown in FIG. 2A. The city of Chicago is the most spatially segregated city in the United States via 2010 census data. This segregation yields significant disparity in resource allocation (see e.g., education and health outcomes by race and ethnicity, particularly between White, Black, and Hispanic communities) for which data was collected. For example, in the Chicago Public School District 299—constituting the entire city of Chicago—White students are the equivalent of 3 academic years ahead of Black students, and 2.3 years ahead of Hispanic students. In various embodiments, the systems and methods described herein are applied to determine a graph representing the resource allocation in Chicago, including for example equitable school access, and generate an improved graph corresponding to the improved environment (e.g., paths and edges of the graph correspond to transit routes and school locations respectively), which mitigates this disparity.

Figure 3A:
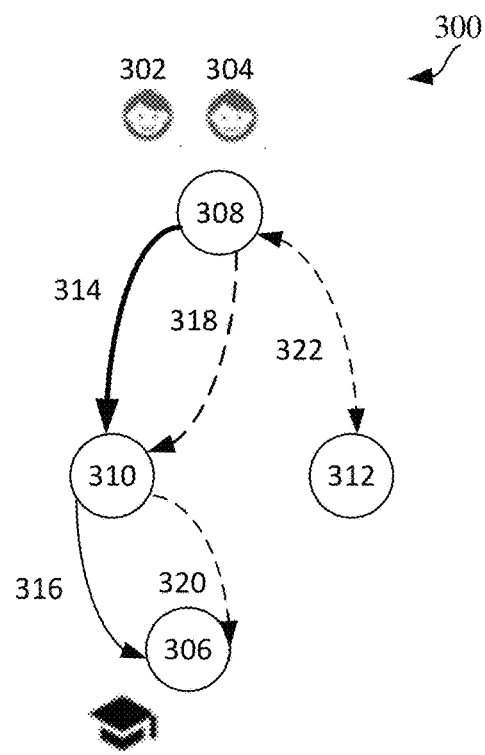
FIGS. 3A and 3B illustrate an example of a graph representing a resource allocation issue prior to and after intervention, according to some embodiments.
Figure 3B:
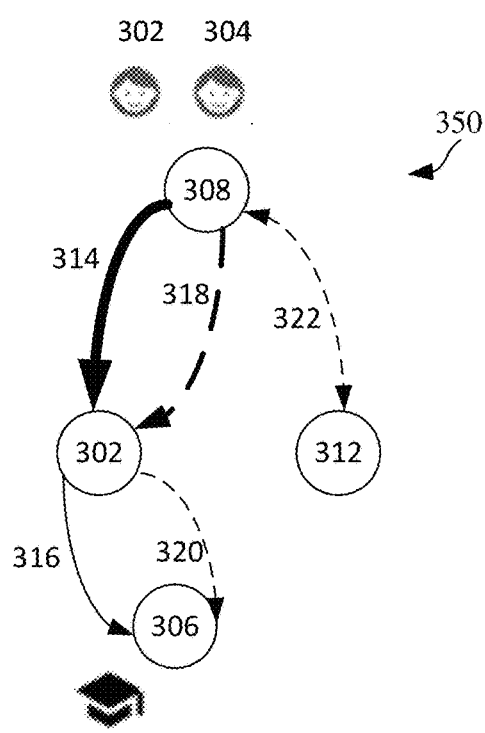

Referring to the example of FIGS. 3A and 3B, a simplified method for graph-based resource allocation to mitigate resource allocation disparity is illustrated. Referring to FIG. 3A, illustrated is a graph 300 representing an environment including a school at 303, accessed by two groups 302 and 304 of students from a same starting location node 308 before intervention. Individuals of two groups 302 and 304 traverse the edges (e.g., edges/connections 314 and 316 for the group 302 indicated by solid lines, connections 318, 320, and 322 for group 304 indicated by dashed lines) of their respective group with access (also referred to as walk) likelihood proportional to edge weights (e.g., illustrated with connection thickness). In an example, the edges correspond to transportation paths, and nodes (e.g., nodes 310 and 312) correspond to stops (e.g., bus stops). Each group has differing movement dynamics through the graph 300, represented by directed edge weights (e.g., illustrated as proportional to their respective movement connection thickness). In an example, the edge weight for edge 314 is twice the edge weight for edge 318. In graph 300 as shown in FIG. 3A, individuals in group 302 arrive at the node 306 representing a school (also referred to as school node 306) in two steps using edges 314 and 316, because the path including 314 and 316 is the only one in the graph for group 302 to reach school node 306 from location node 308. Individuals in group 304 are diverted to the right-most node 312 with some probability in the step using edge 322 (also referred to as connection 322), which may be connected to another school, and are stochastically less likely to arrive at the school node 306 (using steps of edges 318 and 320) than individuals in group 302.

In an example, a trivial solution is to edit the weights for connections for the second group 304 (e.g., connections 318 and 320) equal to weights for connections for the first group 302 (e.g., connections 314 and 316). However, such a solution does not work in examples with a limited edit budget, where the edit budget corresponds to modifications in the environment. For example, a limited edit budget is to change only one transportation path, which corresponds changing only one edge in the graph.

Referring to FIG. 3B, illustrated is an example of an improved graph 350 with the limited edit budget (e.g., one edge), corresponding to the improved environment for resource allocation. Specifically, an optimal additive edit is introduced to improve group 304 arrival to school node 306. For example, the weights of edge (308, 312) (illustrated by increased thickness of connections 314 and 318) are changed with equal proportion to both groups (e.g., a 100% weight increase to both). This change produces greater relative effect for the second group individual's access to the school node 306.

In various embodiments, different graph edits may be used to improve the graph, and thereby improving the environment for resource allocation based on the application. For example, as shown in the example of FIGS. 3A and 3B, both edges (connections 314 and 318) connecting nodes 308 and 310 are changed by some constant unit, which corresponds to one transportation path change in the environment. In another example, a graph edit may correspond to interventions which would be equally utilized by both groups. Yet in another example, changing only one group's weight (e.g., the weight of only one of connections 314 and 318) among multiple edges connecting the same nodes may correspond to an exclusionary intervention in practice. Yet in another example, a budget on the number of interventions, rather than total magnitude of interventions may be used in some embodiments, based on the application. In some embodiments, with a weight-value budget, many edges may be edited, each having a small amount. Such edits to many edges may correspond to non-trivial external costs such as infrastructure construction across many locations in the environment.

Figure 4:
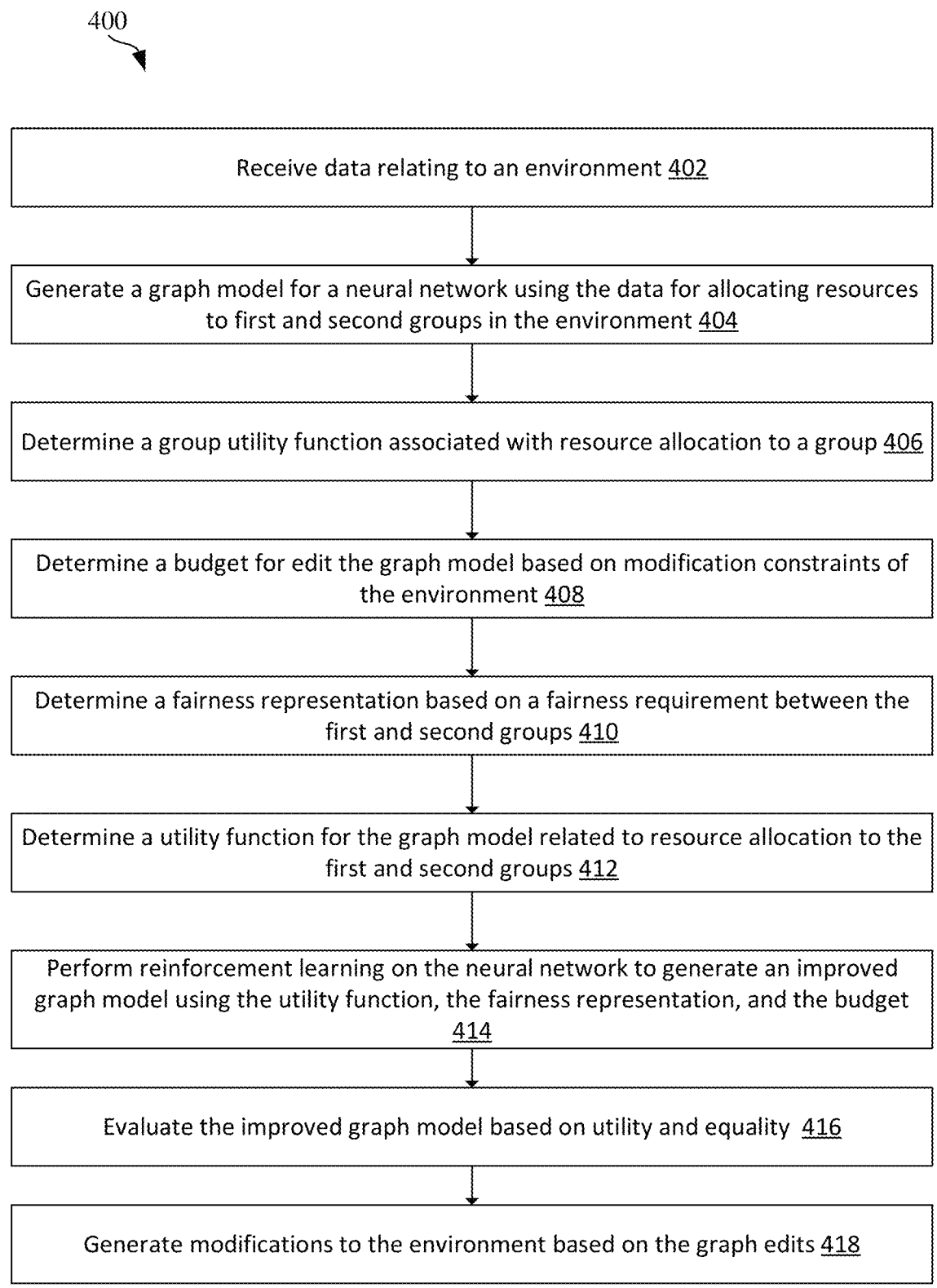
FIG. 4 illustrates a method for graph-based resource allocation in an environment using neural networks.

Referring to FIG. 4, a method 400 for graph-based resource allocation in an environment using neural networks is described. The method 400 begins at block 402, where data (e.g., school locations, transit routes, student home locations, etc.) relating to an environment (e.g., an area including transit networks providing school access to students of different groups). In various embodiments, the environment may contain group biases in resource allocations. For example, the environment may include access bias to resources (e.g., schools, libraries, hospitals, parks, etc.) by groups of different types (e.g., race, gender, age, ethnic groups, etc.)).

At block 404, a graph model (also referred to as a graph or a graph structure) including nodes and edges for the neural network is generated using the received data, such that the graph model for the neural network represents the environment including its structures and resources. In an embodiment, let a graph be represented as $\mathbb{G} = (V, E, W_G)$ with vertex-set $V=\{v_1, \ldots, v_n\}$ of cardinality $|V|=n$, and edge-set $E=\{e_{i,j}\}$ of cardinality $|E|=m$. Assume edges are weighted and directed. For notational convenience, $W_g$ represents a non-negative, weighted representation of edges, $W=\{W_{g(i,j)} \neq 0 \Leftrightarrow e_{i,j}=1 | W_{g(i,j)} \in W, \quad e_{i,j} \in E\}$ and $W_G=\{W_g | g \in G\}$, here G is a set groups and each have its own weight matrix $W_g$. Let reward nodes be a sub-set of nodes $R=\{r \subseteq v\}$.

At block 406, a group utility function of the graph model where the group utility is associated with resource allocation to a particular group is determined. In some embodiments, a particle p is referred to as an instance of starting node positions sampled from distribution $\mu_0$ (g). Set of all movements (also referred to as walks) by a particle $p_g$ of group $g \in G$, can take in a sequence of T nodes (with repetition), is defined by $\mathcal{P}(p_g, W_g, T)$. A utility function evaluating all walks by particle p may be provided as follows:

$$u_g(p) = \mathop{\mathbb{E}}_{path \in \mathcal{P}(p, W_g, T)} \mathbb{1}[r \in \mathcal{N}(path)],$$

where $\mathcal{N}(\cdot) \in V$. A utility function of the entire group g may be measured in walks in expectation as follows:

$$U_g = \mathop{\mathbb{E}}_{p \sim \mu(g)} .$$

In some embodiments, $d(p_g; r)$ be the shortest path for particle $p_g$ along edges E of G to reach a reward node in R. A utility function for each group may be defined as:

$$u_g(p_g; E) = \mathbb{E}_{p_g \sim \mu(g)} \frac{1}{d(p_g, r)}.$$

The utility function is parameterized by the edge set E. A utility function of the entire group g may be defined as:

$$U_g = \mathbb{E}_{p_g \sim \mu(g)}[u_g].$$

The method 400 may proceed to block 408, where constraints for modification of the environment is received, and a graph edit budget B is determined based on the corresponding modification constraints of the environment. For example, modifications (add, remove, change location) of resources (including e.g., schools, libraries, hospitals, etc.) may correspond to node edit budget in the graph model. For further example, modifications to transit routes (e.g., expansion or addition of roads or bus routes) may correspond to edge edit budget in the graph model. In some embodiments, the graph edit budget B provides that only a particular number of edge edits are allowed, and no node edits are allowed. In some embodiments, the graph edit budget B provides that no edge edits are allowed, and only a particular number of node edits are allowed. In some embodiments, the graph edit budget B provides that both a number of edge edits and a number of node edits are allowed.

In various embodiments, a graph edit function may be defined under budget B:

$$e(G,B) \to G', \text{ where } D(G-G') < B \qquad (1)$$

under Hamming distance $D(\cdot)$.

The method 400 may proceed to block 410, where a fairness representation based on a fairness requirement between the first and second groups is determined. In an example, such a fairness representation (e.g., to minimize inequity) may include minimizing the differences between the individual group utility function and an average of all group utility functions (e.g., minimizing $\Sigma_{g \in G} U_g - \overline{U_G}$). In an example, $\overline{U_G}$ is the mean utilities of all groups that may be defined as follows:

$$\overline{U_G} = \Sigma_{c \in G} U_g / |G|$$

In another example, such a fairness representation may include minimizing a difference between the first group utility function and the second group utility function (e.g., minimizing a difference between $U_{g1}$ and $U_{g2}$).

The method 400 may proceed to block 412, where a utility function for the graph model (also referred to as a total utility function) is determined. In an example, the total utility function is determined based on the individual group utility functions, e.g., by combining the first and second group utility functions. In some embodiments, the graph-based resource allocation problem may be defined as follows, which includes a graph G, budget B, time T, and a utility function E. In various embodiments, the graph-based resource allocation problem maximizes the utility function E with the constraints, and as such, the utility function E may also be referred to as a utility maximization function E.

> Given: A graph $\mathbb{G}$, budget B, and time T
> Find: $\mathbb{G}' = e(\mathbb{G}, B)$
> Where:
> $\mathbb{G}' = \underset{\text{st.} \Sigma_{g \in G} U_g - \overline{U_G} = 0}{\operatorname{argmax}} \mathbb{E}[U_g]$
> $\mathcal{D}(G-G') < B$ The method 400 may proceed to block 414, where reinforcement learning is performed on the neural network to generate an improved graph model using the utility function, the fairness representation, and the budget. Graph edits are performed to the original graph model to generate the improved graph model, where the graph edits are with the graph edit budget.

The method 400 may proceed to block 416, where the improved graph model is evaluated based on utility and equality. In some embodiments, the utility is measured based on total expected reward per population/group, and the equity is measured based on the difference in expected reward between classes. In some embodiments, the expected reward per group is estimated by repeated Monte Carlo sampling of weighted walks through the graph. First, sample the starting node of an individual with respect to their initial distribution, then estimate their expected reward over weighted walks from the starting node. Repeatedly sampling individuals yields an expected utility for the graph with respect to each class of individual. In some embodiments, the Gini Index (or Gini Coefficient) is used to measure of inequality. For example, it measures the cumulative proportion of a population vs. the cumulative share of value (e.g. reward) for the population. At equality, the cumulative proportion of the population is equal to the cumulative reward. The measure is typically the deviation from this x=y line, with 1 being total inequality, and 0 total equality.

The method 400 may proceed to block 418, where modifications to the environment are generated based on the graph edits. For example, transit routes modifications are generated based on corresponding edge edits of the graph edits. For further example, facility modifications are generated based on corresponding node edges of the graph edits.

In various embodiments, the GAEA problem may be solved with various solutions, including for example, a greedy baseline solution, an optimization problem solution, and reinforcement learning solution using MRP. Some of these solutions are described in detail below.

Greedy Baseline

In some embodiments, a greedy heuristic solution (also referred to as a greedy baseline solution) may be used for solving the GAEA problem. Specifically, for a given graph $\mathbb{G} = (V, E, W_G)$, at each reward node $r \in R$, breath-first-search (BFS) may be performed for a depth of T to obtain an acyclic graph $\mathbb{G}_r = (V_r, E_r, W_r) | V_r \in V, E_r \in E$ that has all nodes $v_i \in V$ that are reachable from the reward nodes. Reward nodes is a subset of nodes $R \subseteq V$. Edges $e_{i,j} \in E$ are so chosen, such that the cycles to a nodes are broken by selecting edges that are part of the shorted path from the node to the reward node and discarding the rest. The weights of the $W_r$ of these edges are to be cardinality of paths that passes from the reward node to any other node $e_{i,j} \notin R$. The corresponding transition matrix is given by $P_T^* = D_g^{-1} W_g$ where diagonal matrix $$D_{g(i,i)} = \sum_j W_{g(i,j)}$$

for the $\forall_g \in G$ group transition matrix, we have the transition matrix $P_g$. Here $P_T^*$ represent the optimal transition matrix for the given graph topology and reward {E, V, R} that are reachable within time steps T. While $P_g$ represented the biased transition probabilities for the group $g \in G$. We compute:

$P_g^\Delta = P_T^* - P_g$

The $P_g^\Delta$ is the deviation away from the optimal transition matrix $P_T^*$ by group g. Hence in some embodiments, a solution is to pick top B (budget) edges that has highest $P_g^\Delta$ across all groups $g \in G$. The group that has the lowest utility would have the highest deviation and hence will be well represented in the set. We then edit the weights that corresponds to these edges to maximum capacity $W_{max}$.

$W_{g,e} \leftarrow W_{max} | (g,e) \in \{\varepsilon(P_{g,i}) | i \leq k | P_{g,1}^\Delta \geq P_{g,2}^\Delta \ldots \geq P_{g,|S|}^\Delta \forall g \in G\}$ In some embodiments, the closeness centrality of the reward nodes is maximized by editing the transition matrix. The corresponding solution is referred to as Myopic Maximization of Equitable Closeness Centrality (MMECC). It is myopic since it chooses only the shortest path from a node to a reward node. There might exist longer paths which are still reachable that may improve the close centrality of the reward nodes.

Referring to FIG. 5, in some embodiments, a greedy baseline is determined using a Greedy Equitable Centrality Improvement (GECI) method 500 of FIG. 5. Specifically, without equitable access across groups, optimizing for maximum utility Ug reduces the problem to maximizing centrality of the reward nodes r in R. The GECI method applies a greedy improvement in the equitable group access setting. In an example, for a given edge set E, neighborhood Nr(E) (also referred to as Nr) is as all nodes $u \in V$ that have shortest path to reward node r less than T. As shown in the GECI method 500, for every augmentation of edge $E^u$, the group $g_{min}$ that is most disadvantageous or in other words the group with least group utility $U_g$ is picked. A pair of node $(u_{max}, v_{max})$ is picked to form an edge augmentation, such that nodes $v_{max}$ and $u_{max}$ are in and not in the neighborhood Nr respectively and result in maximum change utility $U_{gmin}$, for the candidate group $g_{min}$. The edge augmentation set is updated as follows:

$E^u := E^u \cup \{(u_{max}, v_{max})\}.$

The graph augmentation step is repeated until the budget B is exhausted.

Optimization Formulation

In some embodiments, the GAEA problem is solved as an optimization problem (also referred to as optimization problem solution). Specifically, let $U_g$ be the expected utility of a group. Then the Pareto-optimization of the utilities of all groups can be framed as:

$$J = \max_{\substack{st \cdot \Sigma_{g \in G} U_g - U_G = 0 \\ \Sigma_{g \in G} \|R\|_0 < B}} \mathbb{E}[U_g] \quad (2)$$

The constraints above are non-differential. Specifically, the number of edges to edit may not be solved directly as an optimization problem.

Equitable Mechanism Design in MRP

Referring to FIG. 6, to address the challenges in the above solutions (e.g., the greedy baseline solution, the optimization problem solution), an improved solution is achieved by using MRP learning in the neural network to generate graph-based resource allocation under budget. Illustrated in FIG. 6 is example pseudocode of a method 600 (e.g., used in block 414 of FIG. 4 for reinforcement learning) for implementing such MRP learning.

Specifically, in some embodiments, under the MRP learning, the graph is noted as $\mathbb{G} = (V, E, W_G)$, and the dynamic process of reaching the reward nodes by particle of different group, $g \in G$ are defined as finite horizon Markov Reward Process (MRP). The MRP includes finite set of states, S, a set Markovian state transition probability, $\{P_g | \forall_g \in G\}$, a reward function, $R(s)$, $s \in S$ and a horizon defined by the maximum time step T in a random walk. Here states S corresponds to nodes V, in G, $P_g = D^{-1} W_g$. Unlike Markov Decision Process (MDP), MRP does not have a policy. Unlike most MDP which are optimized for policy, here MRP that does not have a policy is used to design the dynamic of the system.

The state value function of the MRP for a particle, p spawned at state so in group g is given by:

$$v_g(s_0) = \sum_{t=1}^{T} \gamma^t R P_g^t s_0$$

where $\gamma \in [0,1]$, is the discount factor. The use of discount factor, persuades the learning system to choose shorter path reachable under the horizon, T. The expected value function for the group, g is given by:

$$V^g = \mathop{\mathbb{E}}_{s_0 \sim \mu(g)} [v^g(s_0)]$$

We parameterize transition probability as $$P_g = D^{-1} W_g$$

where, $$W_g = W_g^0 + A \odot W_g' \odot E_g, \quad (3)$$

where $W_g^0 \in \mathbb{R}^{|S| \times |S|}$ here is the original weight matrix, $W_g' \in \mathbb{R}^{|S| \times |S|}$ is the learnt increment of the weight matrix. A is unweighted adjacency matrix of $\mathbb{G}$. $E_g \in \{0,1\}^{|S| \times |S|}$ represent the discreet choice of edges that are edited. To make $E_g$ differentiable, continuous relaxation may be performed (e.g., with reparameterization trick using Gumbel sigmoid), defined by $$E_g^{(i,j)} = \frac{1}{(1 + \exp(-(\phi(s \odot 0) + g_{ij})/\tau)}, \forall i, j \in S$$

where, $g_i = -\log(-\log(U))$ is the Gumbel noise.

In various embodiments, over the period of training, the temperature $\tau$ is annealed. As $\tau \to 0$, $E_g$ becomes discrete. As such, we gradually attenuate $\tau \leftarrow \tau * v$ at every epoch. It is noted that the function $\phi(\cdot)$ in the above equation takes a null vector, which effectively learns only the bias, hence making the choice of edits independent of the input state. The problem objective is framed in MRP as:

$$W_G', E_G = \mathop{\mathrm{argmax}}_{\substack{st \cdot \sum_{g \in G} V_g - V_G = 0 \\ \sum_{g \in G} E_G < B}} \sum_{g \in G} V_g$$

In an example, the unconstrained augmented Lagrangian for the above objective is defined as:

$$W_G', E_G = \mathrm{argmax} \sum_{g \in G} V^g - \mu_1 \left( \sum_{g \in G} V_g - \overline{V_G} \right)^2 -$$
$$\mu_2 \left( \sum_{g \in G} E_g - B \right)^2 - \lambda_1 \left( \sum_{g \in G} V_g - V_G \right) - \lambda_2 \left( \sum_{g \in G} E_g - B \right)$$
$$\lambda_1^{new} \leftarrow \lambda_1^{old} + \mu_1 \left( \sum_{g \in G} V_g - \overline{V_G} \right)$$
$$\lambda_2^{new} \leftarrow \lambda_2^{old} + \mu_2 \left( \sum_{g \in G} E_g - B \right)$$

This objective effectively learns the dynamics of the MRP. In some embodiments, in order to prevent noisy gradient, the main objective, one of the constraint at every mini-batch, and/or a combination of both is trained. In some embodiments, a training schedule is devised, where the objective J is optimized without constraint as it saturates. The equity constraint is then introduced, followed by the edit budget constraint. Finally, as the losses saturate, we force discretizing the edge selection by gradually annealing the temperature $\tau$ of the gumble sigmoid.

Facility Location/Facility Placement

In some embodiments, the GAEA problem is used to solve the problem of facility placement. In a graph G, an alternative to augmenting edges Eu in a graph G is to make resources equitably accessible to particles $p_g$ of different groups g in G by selecting optimal placement of reward nodes without changing the edges. This may be referred to as a facility location/placement problem. In case of facility placement, the objective is find the optimal location of reward nodes (R) for a set objective, i.e. equation (2), can be rewritten as:

$$J = \mathop{\max}_{\substack{st \cdot \sum_{g \in G} U_g - \overline{U_G} = 0 \\ \sum_{g \in G} \|R\|_0 < B}} \mathbb{E}[U_g] \quad (4)$$

Specifically, the dynamics P of the MRP are fixed and the objective is parameterized by the reward vector $R \in \{0,1\}^{|S|}$. The MRP of equation (3) is now $W_g = W_g^0$ and $R \in \{0,1\}^{|S|}$, which is modeled as:

$$R^{(s)} = \frac{1}{(1 + \exp(-(\phi(s \odot 0) + g_s)/\tau)}, \forall s \in S$$

In those embodiments, the MRP is trained to optimize for the objective:

$$R = \mathop{\mathrm{argmax}}_{\substack{st \cdot \sum_{g \in G} V_g - V_G = 0 \\ |R| < B}} \sum_{g \in G} V^g.$$

Computational Complexity of GAEA

Theorem 1. GAEA problem is in class of non-approximal NP-hard that cannot be approximated within a factor of $$\left(1-\frac{1}{3e}\right).$$

Proof. Consider a subproblem of GAEA: maximization of expected utility of a single group and hence no constraints on equity. Let us assume there is only one reward node $r \in V$ and the graph is uniformly weighted and $$\exists W=\emptyset | W_g^c \in \{w_{g(i,j)} \in W_g | \epsilon(w_{g(i,j)})=1 \text{ and } W_{g(i,j)}=0\}.$$

there exist zero weight edges when they are in allowed topology of edges E. Now the problem reduces to adding a set of edges, $W_g^a = \{e_{(i,j)} \in W_g^c\}$, to improve reachability of nodes $v \in \mathcal{N}(W_g^c), \mathcal{N}(W_g^c) \subset V$ to r within T steps. Now let us further reduce the problem to just adding edges that are directly incident on the reward node r i.e. $W_g^a = \{e_{(v,r)} \in W_g^c\}$, the optimization problem reduces to $$W_g^a = \underset{st.|W_g^a|<B}{\operatorname{argmax}} \mathbb{P}^*_r[U_g]$$

GAEA problem now reduces to the Maximum Closeness Improvement Problem which is proven to be non-approximal NP-hard through Maximum Set Coverage problem, which cannot be approximated within a factor of $$\left(1-\frac{1}{3e}\right)$$

unless P=NP.

In some embodiments, a virtual absorption node $r_a$ is added to the graph $\mathbb{G}$, such that all reward $r \in R$ transitions over to $r_a$ with unit probability. The state distribution at time step t is given by $$s_t = P_g^t s_0$$

At optimality, in a connected graph, the objective is to have all nodes reach a reward node under timestep T and by virtue of this, reach absorption node $r_a$ under T+1 timesteps, which results in a steady-state distribution.

$$\lim_{t \to \infty} s_t = r_a$$

The convergence speed of s0 to $r_a$ is given by the asymptotic convergence factor:

$$p = \sup_{s_0 \neq r_a} \lim_{t \to \infty} \left(\frac{\|s_t - r_a\|_2}{\|s_0 - r_a\|_2}\right)^{1/t}, \forall g \in G$$

and associated convergence time $$T + 1 = \frac{1}{\log(1/p)}$$

Furthermore, facility location is proven to be sub-modular, hence for unit cost case there exists greedy solution that is $$\left(1-\frac{e}{1}\right)$$

from optimal. There is also a tighter problem-dependent bound that is $$\frac{1}{2}\left(1-\frac{1}{e}\right)$$

from the optimal.

Performance Evaluation

The systems and methods for GAEA that uses a neural network based on MRP based reinforcement learning for graph-based resource-allocation described above (e.g., using methods 400 and 600) are evaluated on several synthetic graphs, including generative random graph models which yield instances of graphs with a set of desired properties. These synthetic graphs are used to evaluate the GAEA graph editing method with respect to the parameters of the graph model. Four example graph models are used, including the Erdös-Rényi (ER), Preferential Attachment Cluster Graph (PA), Chung-Lu power-law graph (CL), and the Stochastic Block Model (SBM).

Erdös-Rényi Random Graph (ER): The Erdös-Rényi random graph is parameterized by p, the uniform probability of an edge between two nodes. The expected node degree is therefore p|N|, where |N| is the number of nodes in G. This ER graph is used to measure the effectiveness of GAEA with varying graph densities. As the density increases, it becomes more difficult to affect the reward of nodes through uncoordinated edge changes.

Preferential Attachment Cluster Graph (PA): The Preferential Attachment Cluster Graph graph model is an extension of the Barabási-Albert graph model. This model is parameterized by m added edges per new node, and the probability p of adding an edge to close a triangle between three nodes. The BA model iteratively adds nodes to a graph by connecting each new node with m edges, proportional to the degree of existing nodes. This yields a power law degree distribution with probability of nodes with degree K: $P(k) \sim k^{-3}$. The cluster graph PA model generalizes to the base BA model at p=0.

The PA graph is used to evaluate the method's performance on graphs with varying clustering. This is similar to the ER setting, where higher clustering makes it more difficult to traverse farther in the graph, except under the same edge density.

Chung-Lu Power Law Graph (CL) The Chung-Lugraph model yields a graph with expected degree distribution of an input degree sequence d. We sample a power-law degree distribution, yielding a model pa-rameterized by $\gamma$ for $P(k) \sim k^{-\gamma}$. This is the likelihood of sampling a node of degree K. In this model, $\gamma=0$ yields a random-degree graph and increasing $\gamma$ yields more skewed distribution (i.e. fewer high-degree nodes and more low-degree nodes).

The CL graph model is used to measure the method's performance with respect to node centrality. As $\gamma$ increases, routing is more likely through high-degree nodes (e.g. their centrality increases). In some examples, rewards are placed at high-degree nodes (Section). It is anticipated that expected rewards increases with γ on uniform edge weights.

Stochastic Block Model (SBM) The SBM samples edges within and between M clusters. The model is parameterized by an [M×M] edge probability matrix. Typically, itra-block edges have a higher probability: $m_{i,i} > m_{i,j}$, where $j \neq i$.

The SBM model is used to measure the performance at routing between clusters. In an example, setting, we instantiate two equal sized clusters with respective intra- and inter-cluster probability: [0.1, 0.01]. We sample particles starting within each cluster.

This experiment measures the method's ability to direct particles into a sparsely connected area of the graph. This may be relevant in social or information graphs where rewards are only available in certain communities and our method proposes interventions to Edge and Particle definitions For each of the above graph models we create a graph edge-set, which we then sample two or more edge-weight sets and sets of diffusion particles. For simplicity we'll cover sampling two, for red and black diffusion particles.

For all the synthetic experiments, for black diffusion particles we define edge weights proportional to node degree:

$$w_{i,j}^b = \deg(i) \cdot \deg(j) \quad (5)$$

For red particles, we define edge weights inversely proportional to degree nodes:

$$w_{i,j}^r = \frac{1}{\deg(i) \cdot \deg(j)} \quad (6)$$

For each diffusion step, a particle at node i transitions to a neighboring node by sampling from the normalized distribution weight of edge incident to i.

The above weighting means that black particles will probabilistically favor diffusion through high-degree nodes, while red particles favor diffusion through low-degree nodes.

We use random initial placement of particles within the graph. The difference in edge diffusion dynamics thus constitute bias within the environment.

Problem Instances: Reward Placement

For each of the above synthetic graph models, two different problems are tested by varying the definition of reward nodes on the graph.

For the high-degree problem, we sample k=3 nodes proportional to their degree:

$$P(i) = \frac{\deg(i)}{\sum_{j \in V} \deg(j)} \quad (7)$$

For the low-degree problem, we sample k=3 nodes inversely proportional to their degree:

$$P(i) = \frac{\deg(i)^{-1}}{\sum_{j \in V} \deg(j)^{-1}} \quad (8)$$

It shows that in some embodiments, in power-law graphs such as PA and CL, black particles which favor high-degree nodes are advantaged and should have a higher expected reward. Black particles may be advantaged in the low-degree placement, because routing necessarily occurs through high-degree nodes for graphs with highly skewed degree distributions. Overall, the low-degree problem instance may be relatively harder for graph editing methods.

Evaluation

In various embodiments, evaluation may be performed by comparing the graph outputs produced by reinforcement learning method (e.g., using methods 400 and 500) against the baseline (e.g., using method 500) and the input graph, for equity and utility.

In an example, to define utility, the expected reward per group is defined by repeated Monte Carlo sampling of weighted walks through the graph. First, we sample the starting node of an individual with respect to their initial distribution, then estimate their expected reward over weighted walks from the starting node. Repeatedly sampling individuals yields an expected utility for the graph with respect to each class of individual. We measure the total expected reward per population (utility), and the difference in expected reward between classes (equity).

Furthermore, while in some embodiments, the reinforcement learning model only optimizes on the expectation, it performs surprisingly well at minimizing the Gini Index.

Evaluation Metrics

Average Reward In an example, three graphs including the initial graph before editing, and the outputs of a baseline (e.g., GECI baseline), and the reinforcement learning using MRP. 5000 weighted walks are simulated according to the initial distributions of each particle type. Average reward is aggregated across these particle types.

Gini Index In an example, the Gini Index is used as a measure of inequality. It measures the cumulative proportion of a population vs. the cumulative share of value (e.g. reward) for the population. At equality, the cumulative fraction of the population is equal to the cumulative reward. The measure is the deviation from this x=y line, with 1 being total inequality, and 0 total equality.

Synthetic Results

The synthetic results with varying budget based on the different methods and graphs show that for the four example graph models described above, over almost all budgets, the MRP-based reinforcement learning method outperforms the baseline. Furthermore, in the low budget scenario, the MRP-based reinforcement learning method outperforms on Gini Index. For utility, the MRP-based reinforcement learning method outperforms the baseline as much as 0.5 under the same budget. In particular, PA, and ER graphs are improved the most.

Figure 7:
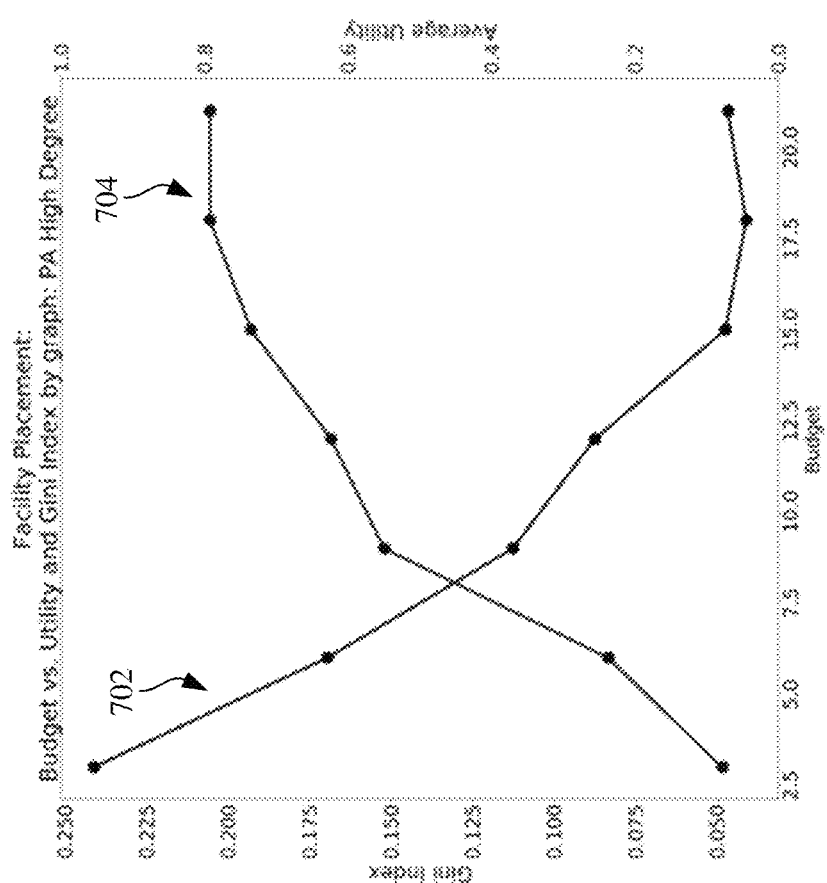
FIG. 7 illustrates performance comparison including utility comparison of different solutions for graph-based resource allocation according to some embodiments.

Referring to FIG. 7, experiment results for using MRP-based reinforcement learning method to solves the facility placement problem are illustrated. As discussed above, the facility placement problem selects a number of nodes which maximizes the reward for particles sampled onto the graph from initial distributions. FIG. 7 shows the results of a small example experiment. The Gini Index curve 702 decreases on increased budget of 15 for a synthetic PA graph of size |N|=200. At the same time, as shown in the utility curve 704, the average utility increases to approximately the same budget. Note the initial location of PA High Degree under budget 3 using the greedy PA high degree heuristic. This is approximately 4 for both Gini Index and Reward. The MRP-based reinforcement learning method maintains far lower Gini Index. Therefore, this node set largely covers the transition dynamics of the initial distributions.

Application: Equitable School Access Chicago

As shown in FIGS. 2A and 2B, GAEA may be applied to measure school inequity in the city of Chicago is described in detail below. First, a coarse transportation network is inferred using the trajectory data of public bus lines from the Chicago Transit Authority (CTA), e.g., from FIG. 2B. Nodes are given by route intersections, and edges are inferred from neigh-boring preceding and following intersections. This yields a graph with 2011 nodes and 7984 edges.

School location and quality evaluation data are collected from the Chicago Public School (CPS) data portal. The 2018-2019 School Quality Rating Policy assessment are used, and elementary or high schools with an assessment of "Level 1+," corresponding to "exceptional performance" of schools over the 90th percentile are used. In an example, only non-charter, "network" schools which represent typical public schools are selected. Geolocation provided by CPS are used to create nodes within the graph. These nodes are attached to the graph using 2-nearest neighbor search to the transportation nodes. Finally, tract-level demographic data from the 2010 census are collected.

In some examples, three classes of particle are sampled onto the network, representing White, Black, and Hispanic individuals by their respective empirical distribution over census tracts. Then random sampling of nodes within that tract is used assign the particle's initial position. In an example, initial edge weights are set for all groups, with weights inversely proportional to edge distance.

Table 1 below shows the result for a budget of 400 edges in the Chicago transportation network. The baseline is surprisingly ineffective at increasing reward. The GAEA model using MRP-based reinforcement learning (referred to as Model in Table 1) successfully optimizes for both utility and equity (indicated by the Gini index) and achieves a very high performance on both metrics. Note that both the baseline and the GAEA model using MRP-based reinforcement learning make the same number of edits on the graph. This result suggests that the base-line performs poorly on graphs with a high diameter such as infrastructure graphs.

TABLE 1

Chicago Public School with budget = 400
Chicago Schools

|  | Initial | Baseline | Model |
|---|---|---|---|
| Avg. Utility | 0.20 | 0.21 | 0.90 |
| Gini Index | 0.62 | 0.65 | 0.07 |

Similarly, in some examples, the baseline may perform poorly on ER, which has relatively dense routing. In contrast, our model learns the full reward function over the topology and can discover edits at the edge of its horizon.
Social Networks In some embodiments, the GAEA model using MRP-based reinforcement learning is applied to reducing inequity in social networks. Social networks within universities and organizations may enable certain groups to more easily access people with valuable information or influence. In an example, the Facebook100 dataset is used, which contains friendship networks at 100 US universities at some time in 2005. The node attributes of this network include: dorm, gender, graduation year, and academic major. Analyzing Facebook networks of universities yield sets of new social connections that would increase equitable access to certain attributed nodes across gender groups.

Figure 8:
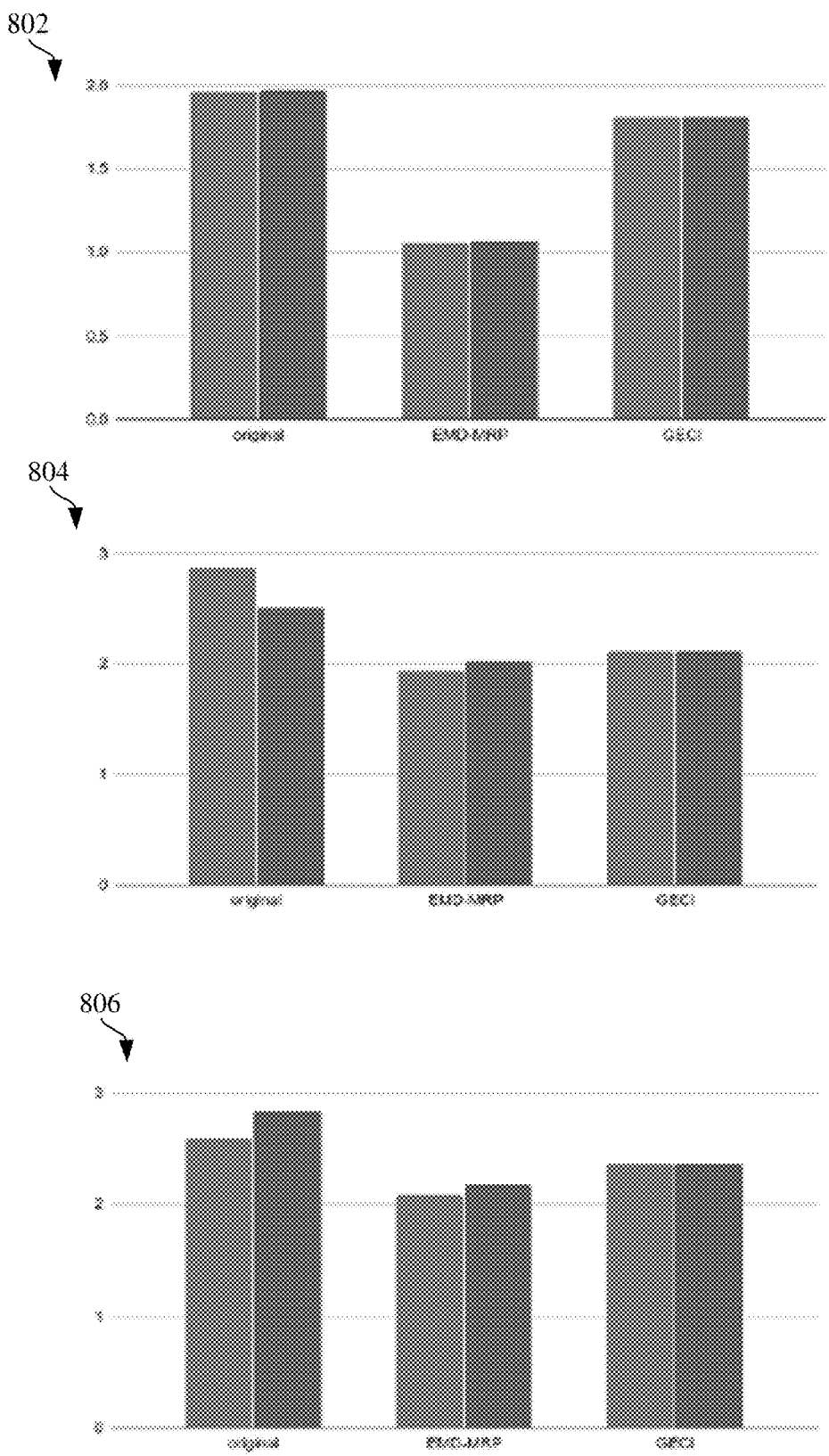
FIG. 8 illustrates performance of embodiments for determining facility placement using graph-based resource allocation with a neural network according to some embodiments.

In an example, popular seniors are defined as the reward nodes and the objective is for freshmen of both genders to have equitable access to these influential nodes. In the example, specific gender information is masked by the term white and black particles. The results are demonstrated using 3 of the 100 universities in the dataset. As shown in FIG. 8, results 802, 804, and 806 illustrate the mean shortest path of gender groups (lighter and darker) from the influence nodes at three universities respectively. Table 2 below illustrate the graph properties including nodes, edges, and editable edges for each of these three universities.

TABLE 2

Graph properties of university social networks

|  | 802 | 804 | 805 |
|---|---|---|---|
| num. nodes, \|V\| | 770 | 963 | 163806 |
| num. edges, \|E\| | 33312 | 37624 | 163806 |
| num. editable edges \|A\| | 336597 | 474439 | 3958660 |

Table 3 below shows the intra-group Gini index. With sufficient hyperparameter tuning, the MRP-based reinforcement learning model consistently outperforms the greedy GECI baseline on intra-group Gini index and minimizing overall shortest path of the freshman from the influence node across groups.

TABLE 3

Intra-group Gini Index

|  | Original | EMD-MRP | GECI |
|---|---|---|---|
| 804 | 0.214 | 0.093 | 0.153 |
| 802 | 0.092 | 0.065 | 0.812 |
| 806 | 0.115 | 0.086 | 0.157 |

As such, GAEA model using MRP-based reinforcement learning is described. The model entails editing of graph edges, to achieve equitable utility across disparate groups. It is applied to achieve of equitable access in graphs, and in particular applications, equitable access for resources including for example, infrastructure networks and education. The method is evaluated on extensive synthetic experiments on different synthetic graph models and many total experimental settings.

Some examples of computing devices, such as computing device 100 may include non-transitory, tangible, machine readable media that include executable code that when run by one or more processors (e.g., processor 110) may cause the one or more processors to perform the processes of methods 400, 500, and 600. Some common forms of machine readable media that may include the processes of methods 400, 500, and 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for using a neural network to improve resource allocation, comprising:
   receiving, by the neural network, a graph model,
   wherein the graph model is based on data relating to an environment for allocating resources to a first group and a second group,
      wherein the environment includes resource locations and transit routes associated with the resource locations;
   receiving, by the neural network, a budget for editing the graph model based on a cost of corresponding modification to the environment,
   determining, by the neural network, a fairness representation based on a fairness requirement between the first group and the second group;
   determining, by the neural network, a utility function for the graph model based on a first group utility and a second group utility representing resource allocation to the first group and the second group respectively; and
   training the neural network based on a training schedule, by performing reinforcement learning on the neural network using the budget, utility function, and fairness representation, wherein the training schedule includes:
      during a first step, an objective function is optimized without an equity constraint associated with the fairness representation; and
      during a second step following the first step, the objective function is optimized with the equity constraint;
   generating, using the trained neural network, an improved graph model based on graph edits to the graph model; and
   providing modifications to the environment based on the graph edits, wherein the modifications to the environment include:
      a first plurality of modifications to the resource locations, wherein the first plurality of modifications are generated based on node edits of the graph edits; or
      a second plurality of modifications to the transit routes, wherein the second plurality of modifications are generated based on edge edits of the graph edits.

2. The method of claim 1, wherein the performing reinforcement learning includes performing a Markov Reward Process.

3. The method of claim 1, wherein the fairness representation is determined based on a difference between the first group utility and the second group utility.

4. The method of claim 1, wherein the budget includes a graph edge budget for modification of one or more graph edges corresponding to one or more transit routes between facility locations in the environment, and
   wherein the facility locations correspond to graph nodes in the graph model.

5. The method of claim 1, wherein the budget does not include a graph node budget for modification of one or more graph nodes.

6. The method of claim 1, wherein the budget includes a graph node budget for modification of one or more graph nodes.

7. The method of claim 1, wherein the environment includes a transportation infrastructure.

8. A non-transitory machine-readable medium comprising a plurality of machine-readable instructions which, when executed by one or more processors, are adapted to cause the one or more processors to perform a method comprising:
   receiving, by a neural network, a graph model,
   wherein the graph model is based on data relating to an environment for allocating resources to a first group and a second group,
      wherein the environment includes resource locations and transit routes associated with the resource locations;
   receiving, by the neural network, a budget for editing the graph model based on a cost of corresponding modification to the environment,
   determining, by the neural network, a fairness representation based on a fairness requirement between the first group and the second group;
   determining, by the neural network, a utility function for the graph model based on a first group utility and a second group utility representing resource allocation to the first group and the second group respectively; and
   training the neural network based on a training schedule, by performing reinforcement learning on the neural network using the budget, utility function, and fairness representation, wherein the training schedule includes:
      during a first step, an objective function is optimized without an equity constraint associated with the fairness representation; and
      during a second step following the first step, the objective function is optimized with the equity constraint;
   generating, using the trained neural network, an improved graph model based on graph edits to the graph model; and
   providing modifications to the environment based on the graph edits, wherein the modifications to the environment include:
      a first plurality of modifications to the resource locations, wherein the first plurality of modifications are generated based on node edits of the graph edits; or
      a second plurality of modifications to the transit routes, wherein the second plurality of modifications are generated based on edge edits of the graph edits.

9. The non-transitory machine-readable medium of claim 8, wherein the performing reinforcement learning includes performing a Markov Reward Process.

10. The non-transitory machine-readable medium of claim 8, wherein the fairness representation is determined based on a difference between the first group utility and the second group utility.

11. The non-transitory machine-readable medium of claim 8, wherein the budget includes a graph edge budget for modification of one or more graph edges corresponding to one or more transit routes between facility locations in the environment, and
wherein the facility locations correspond to graph nodes in the graph model.

12. The non-transitory machine-readable medium of claim 8, wherein the budget does not include a graph node budget for modification of one or more graph nodes.

13. The non-transitory machine-readable medium of claim 8, wherein the budget includes a graph node budget for modification of one or more graph nodes.

14. The non-transitory machine-readable medium of claim 8, wherein the environment includes a social network.

15. A system, comprising:
a non-transitory memory; and
one or more hardware processors coupled to the non-transitory memory and configured to read instructions from the non-transitory memory to cause the system to perform a method comprising:
receiving, by the neural network, a graph model, wherein the graph model is based on data relating to an environment for allocating resources to a first group and a second group,
wherein the environment includes resource locations and transit routes associated with the resource locations;
receiving, by the neural network, a budget for editing the graph model based on a cost of corresponding modification to the environment,
determining, by the neural network, a fairness representation based on a fairness requirement between the first group and the second group;
determining, by the neural network, a utility function for the graph model based on a first group utility and a second group utility representing resource allocation to the first group and the second group respectively; and
training the neural network based on a training schedule, by performing reinforcement learning on the neural network using the budget, utility function, and fairness representation, wherein the training schedule includes:
during a first step, an objective function is optimized without an equity constraint associated with the fairness representation; and
during a second step following the first step, the objective function is optimized with the equity constraint;
generating, using the trained neural network, an improved graph model based on graph edits to the graph model; and
providing modifications to the environment based on the graph edits, wherein the modifications to the environment include:
a first plurality of modifications to the resource locations, wherein the first plurality of modifications are generated based on node edits of the graph edits; or
a second plurality of modifications to the transit routes, wherein the second plurality of modifications are generated based on edge edits of the graph edits.

16. The system of claim 15, wherein the performing reinforcement learning includes performing a Markov Reward Process.

17. The system of claim 15, wherein the fairness representation is determined based on a difference between the first group utility and the second group utility.

18. The system of claim 15, wherein the budget includes a graph edge budget for modification of one or more graph edges corresponding to one or more transit routes between facility locations in the environment, and
wherein the facility locations correspond to graph nodes in the graph model.

19. The system of claim 15, wherein the budget does not include a graph node budget for modification of one or more graph nodes.

20. The system of claim 15, wherein the budget includes a graph node budget for modification of one or more graph nodes.

* * * * *